(12) United States Patent
Ekström

(10) Patent No.: US 12,292,139 B2
(45) Date of Patent: May 6, 2025

(54) ADAPTER AND METHOD FOR CONNECTING

(71) Applicant: CEJN AB, Skövde (SE)

(72) Inventor: Jörgen Ekström, Skövde (SE)

(73) Assignee: CEJN AB, Skövde (SE)

( * ) Notice: Subject to any disclaimer, the term of this patent is extended or adjusted under 35 U.S.C. 154(b) by 268 days.

(21) Appl. No.: 18/194,866

(22) Filed: Apr. 3, 2023

(65) Prior Publication Data
US 2023/0313922 A1  Oct. 5, 2023

(30) Foreign Application Priority Data

Apr. 4, 2022 (GB) ...................................... 2204866

(51) Int. Cl.
| | | |
|---|---|---|
| *F16L 21/02* | (2006.01) | |
| *F16L 39/04* | (2006.01) | |
| *F16L 27/12* | (2006.01) | |
| *F16L 37/26* | (2006.01) | |
| *F16L 37/413* | (2006.01) | |
| *F16L 37/42* | (2006.01) | |
| *F16L 37/50* | (2006.01) | |
| *F16L 37/56* | (2006.01) | |

(Continued)

(52) U.S. Cl.
CPC ............. *F16L 21/022* (2013.01); *F16L 39/04* (2013.01); *F16L 27/125* (2013.01); *F16L 37/26* (2013.01); *F16L 37/413* (2013.01); *F16L 37/42* (2013.01); *F16L 37/50* (2013.01); *F16L 37/56* (2013.01); *F16L 55/07* (2013.01); *F16L 2201/10* (2013.01); *F16L 2201/20* (2013.01); *G02B 6/3825* (2013.01)

(58) Field of Classification Search
CPC ......... F16L 21/022; F16L 39/04; F16L 55/07; F16L 2201/10; F16L 2201/20; F16L 37/413; F16L 37/42; F16L 37/50; F16L 37/56; F16L 37/26; F16L 27/125; G02B 6/3825
USPC .......................................................... 137/269
See application file for complete search history.

(56) References Cited

U.S. PATENT DOCUMENTS 2,578,542 A * 12/1951 Fletcher ................ F16L 37/086
285/190
3,331,404 A *  7/1967 Gehring .................... F02K 9/54
141/91

(Continued)

FOREIGN PATENT DOCUMENTS

GB  2537127 A  10/2016

*Primary Examiner* — Minh Q Le
(74) *Attorney, Agent, or Firm* — Slayden Grubert Beard PLLC

(57) ABSTRACT

Various embodiments include an adapter between two connectors and a coaxial coupling or a coaxial nipple. The two connectors are any combination of a separate coupling and a separate nipple. The adapter may include: a body with two cylindrical openings; a first element that fits in the first opening with connections for a first of the two connectors and the coaxial coupling or nipple; and a second element that fits in the second cylindrical opening, and a third connection for the other connector. The first element slides and rotates in the body and has a central axis eccentric to a central axis of the cylindrical first element part. The second element slides and rotates in the body. The central axis of the third connection is eccentric to a central axis of the cylindrical second element part.

15 Claims, 5 Drawing Sheets

(51) Int. Cl.
*F16L 55/07* (2006.01)
*G02B 6/38* (2006.01)

(56) References Cited

U.S. PATENT DOCUMENTS

| | | | | |
|---|---|---|---|---|
| 3,990,731 | A | 11/1976 | Schnipke | 285/136 |
| 4,103,938 | A * | 8/1978 | Lasater | F16L 39/04 |
| | | | | 285/276 |
| 4,142,742 | A * | 3/1979 | Cornett | F16L 39/04 |
| | | | | 285/123.1 |
| 4,239,262 | A * | 12/1980 | Krupp | F16L 39/04 |
| | | | | 285/179 |
| 4,776,615 | A * | 10/1988 | Young | F16L 27/047 |
| | | | | 285/261 |
| 5,713,609 | A * | 2/1998 | Mascola | F16L 27/093 |
| | | | | 285/190 |
| 6,047,729 | A * | 4/2000 | Hollister | F17C 13/025 |
| | | | | 137/557 |
| 6,648,375 | B1 * | 11/2003 | Panek | F16L 39/00 |
| | | | | 285/124.1 |
| 2009/0051161 | A1 * | 2/2009 | Ekstrom | F16L 39/00 |
| | | | | 285/29 |
| 2015/0041010 | A1 * | 2/2015 | Ekstrom | F16L 37/413 |
| | | | | 137/614.06 |
| 2015/0137516 | A1 * | 5/2015 | Pangburn | F04B 53/16 |
| | | | | 285/347 |
| 2017/0175783 | A1 * | 6/2017 | Debernardi | F15B 13/0814 |
| 2018/0043317 | A1 * | 2/2018 | Kimberlin | F04C 2/344 |
| 2022/0034436 | A1 * | 2/2022 | Holst | F16L 37/56 |
| 2024/0401735 | A1 * | 12/2024 | Rossetti | F16L 55/07 |

* cited by examiner

ADAPTER AND METHOD FOR CONNECTING

CROSS-REFERENCE TO RELATED APPLICATIONS

This application claims priority to GB Application No. 2204866.4 filed Apr. 4, 2022, the contents of which are hereby incorporated by reference in their entirety.

TECHNICAL FIELD

The present disclosure relates to fluid circuits. Various embodiments of the teachings herein include systems and/or methods for connecting parts of a fluid circuit. For example, some embodiments include an adapter between a separate coupling and a separate nipple.

BACKGROUND

A hydraulic tool normally requires hydraulic fluid from a pump. Hydraulic fluid is pumped to the hydraulic tool, which uses the hydraulic fluid to move the tool. The hydraulic fluid is then lead from the hydraulic tool back to the pump. Such a circular connection between the pump and the hydraulic tool provides power to the tool. Many hydraulic tools driven by hydraulic fluid require hydraulic hoses and couplings. The pump has a nipple, the male part, and a coupling, the female part. To the nipple is a hose connected to the hydraulic tool, and to the coupling is another hose connected to the hydraulic tool. In this way hydraulic power can be provided to the tool. However, it is a problem to use two hoses next to each other from the pump to the hydraulic tool, because they may get tangled and twisted with each other as the hydraulic tool is moved. Since the pump is stationary, but the tool is moved by an operator, the two hoses easily get tangled and twisted. It is therefore desirable to avoid this.

A further problem is that the pump has a nipple and a coupling in a fixed position. Therefore, anything that is connected to the pump must fit the fixed positions of the nipple and the coupling. Different pumps have different relative positions between the nipple and the coupling, and different nipples and couplings. A pump may have several nipples and several couplings positioned and arranged in a specific pattern on a block. This makes it difficult to connect different kind of hoses to a pump since one is limited to the block and its specific pattern and configuration. One would not like to make structural changes to a pump.

Couplings for a hydraulic tool do not allow much movement or freedom of the hydraulic supply hoses. When the hoses are coupled to the hydraulic tool, then the hoses can prevent the hydraulic tool from reaching or operating at the necessary location. Further problems arise when the hoses are under pressure of the hydraulic fluid and cannot be moved easily or at all. An arrangement between the pump and hydraulic tool that allows to freely select the hose or hoses to be used and how they can be moved between the pump and the hydraulic tool is desirable.

Any fluid hose and its connections and parts must also fit and work together with already existing pumps and their connections and parts. Any solution must work together with existing pumps, tools, and fluid hoses. It is desirable that any solution is simple, not expensive to produce, and is reliable. It is further a technical problem to avoid cumbersome arrangements that are expensive to manufacture or assemble or take up space.

SUMMARY

Various teachings of the present disclosure include adapters and methods for connecting to a pump. For example, some embodiments include an adapter between, on one hand, two connectors, and on the other hand, a coaxial coupling or a coaxial nipple (30); the two connectors are any combination of a separate coupling (10) and a separate nipple (20); the adapter comprising: a body (100) comprising a first cylindrical opening (120) for a first element (200) and a second cylindrical opening (130) for a second element (300); the first element (200) comprising a first element part (250) being cylindrical to fit in the first cylindrical opening (120), a first connection (210), of the first element (200), for one of the two connectors, and a second connection (220), of the first element (200), for the coaxial coupling or nipple (30); the second element (300) comprising a second element part (350) being cylindrical to fit in the second cylindrical opening (130), and a first connection (310), of the second element (300), for the other of the two connectors; wherein the first element (200) is slidably and rotatably arranged in the body (100), and a central axis (214) of the first connection (210), of the first element (200), is eccentric to a central axis (212) of the cylindrical first element part (250); and wherein the second element (300) is slidably and rotatably arranged in the body (100), and a central axis (314) of the first connection (310), of the second element (300), is eccentric to a central axis (312) of the cylindrical second element part (350).

In some embodiments, the central axis (214) of the first connection (210), the central axis (212) of the cylindrical first element part (250), the central axis (314) of the first connection (310), and the central axis (312) of the cylindrical second element part (350) are all arranged parallel to each other.

In some embodiments, the first connection (210), of the first element (200), and the first connection (310), of the second element (300), face in one direction, and the second connection (220), of the first element (200), faces in the opposite direction.

In some embodiments, each or any two or all three of the body (100), the first element (200), and the second element (300) comprises a safety valve (360) configured to open at a pre-set pressure.

In some embodiments, the first cylindrical opening (120), for the first element (200), comprises a first circumferential fluid groove (240); the second cylindrical opening (130), for the second element (300) comprises a second circumferential fluid groove (340); and the first circumferential fluid groove (240) and the second circumferential fluid groove (340) being connected with a fluid connection passage (110).

In some embodiments, the first element (200) comprises a first fluid passage (230) connecting the first circumferential groove (240) with an outer passage (234) of the second connection (220), of the first element (200), for the coaxial coupling or nipple (30); and wherein the first element (200) comprises a second fluid passage (232) connecting the first connection (210), of the first element (200), for one of the two connectors, with an inner passage (236) of the second connection (220), of the first element (200), for the coaxial coupling or nipple (30).

In some embodiments, the second element (300) comprises a third fluid passage (330) connecting the first connection (310), of the second element (300), for the other of the two connectors, with a fourth fluid passage (332); and the fourth fluid passage (332) traversing along the diagonal of the second element (300) connecting to the second circumferential fluid groove (340).

In some embodiments, the first element (200) and the second element (300) each comprises axial stops (270, 370) limiting their slidable movement within the body (100).

In some embodiments, the first element (200) or the second element (300) has a flange (280, 380) extending perpendicular to the axis of the first element (200) or the second element (300), respectively.

In some embodiments, the adapter further comprises the coaxial nipple (30) or the coaxial coupling (30), the coaxial nipple or coupling being a rotatable coaxial nipple or coupling, allowing the coaxial nipple or coupling to rotate relative to the adapter; and/or wherein the first element (200) comprises one of the two connectors, and the coaxial coupling or a coaxial nipple (30), and the second element (300) comprises the other of the two connectors.

In some embodiments, the adapter further comprises sealing means (150) between the first cylindrical opening (120) and the first element (200), and between the second cylindrical opening (130) and the second element (300); or wherein only the central axis (214) of the first connection (210), of the first element (200), is eccentric to the central axis (212) of the cylindrical first element part (250), or only the central axis (314) of the first connection (310), of the second element (300), is eccentric to a central axis (312) of the cylindrical second element part (350).

As another example, some embodiments include a method for connecting a pump (400), having two connectors, to a machine (500) using an adapter incorporating teachings of the present disclosure; the two connectors of the pump are any two of a separate coupling and a separate nipple; the method comprising: sliding and rotating (610) one or both of the first element (200) and the second element (300) to adjust the distance between, on one hand, the first connection (210), of the first element (200), for one of the two connectors, and, on the other hand, the first connection (310), of the second element (300), for the other of the two connectors; connecting (620) the adapter to the two connectors (410, 420) of the pump (400); and connecting (630) a hose (450) with a coaxial coupling and nipple between the adapter and the machine (500).

In some embodiments, when any one or any two or all three of the body (100), the first element (200), and the second element (300) comprises a safety valve (360) configured to open at a pre-set pressure, the method further comprises if the safety valve (360) lets out fluid, then change (640) the connection to one of the two connectors of the pump (400) with the connection to the other of the two connectors of the pump (400).

In some embodiments, the method further comprises changing (650) one or more of the two connectors, and the coaxial coupling (30) or coaxial nipple of the adapter, and, or alternatively, use (660) an extension (390) between, on one hand, the first connection (210), of the first element (200), for one of the two connectors, or the first connection (310), of the second element (300), for the other of the two connectors, and on the other hand any one of the two connectors.

In some embodiments, the method further comprises connecting (670) a rotatable coaxial coupling (30) or nipple to the adapter.

BRIEF DESCRIPTION OF THE DRAWINGS

The accompanying drawings illustrate presently exemplary embodiments of the disclosure and serve to explain, by way of example, the principles of the disclosure. In the figures.

DETAILED DESCRIPTION

Figure 1:
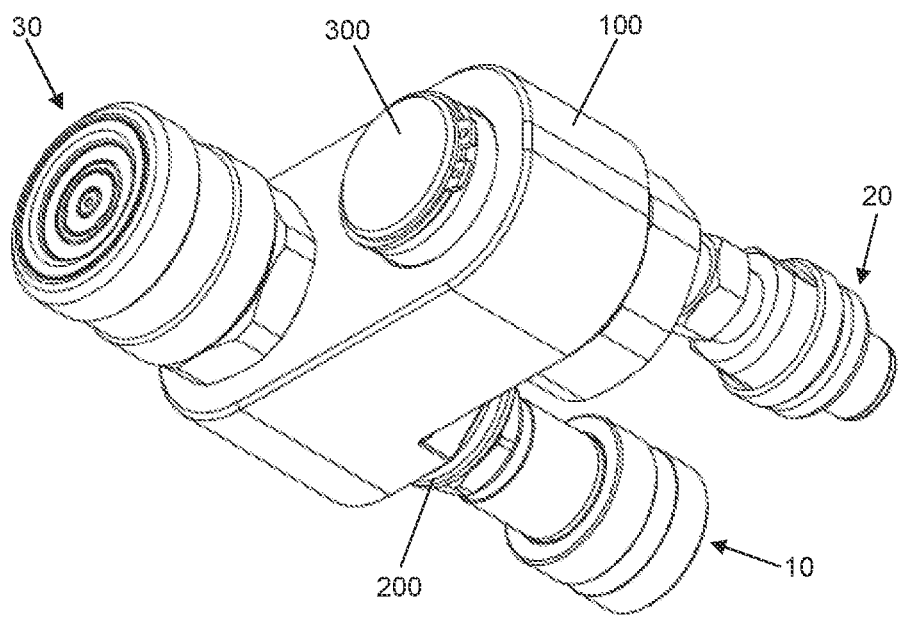
FIG. 1 is a diagrammatic illustration of an example adapter incorporating teachings of the disclosure.

Various embodiments of the teachings herein include an adapter between, on one hand, two connectors, and on the other hand, a coaxial coupling or a coaxial nipple (30). The two connectors are any combination of a separate coupling (10) and a separate nipple (20). The adapter comprises a body (100) comprising a first cylindrical opening (120) for a first element (200) and a second cylindrical opening (130) for a second element (300). The first element (200) comprising a first element part (250) being cylindrical to fit in the first cylindrical opening (120), a first connection (210), of the first element (200), for one of the two connectors, and a second connection (220), of the first element (200), for the coaxial coupling or nipple (30). The second element (300) comprising a second element part (350) being cylindrical to fit in the second cylindrical opening (130), and a first connection (310), of the second element (300), for the other of the two connectors. The first element (200) is slidably and rotatably arranged in the body (100), and a central axis (214) of the first connection (210), of the first element (200), is eccentric to a central axis (212) of the cylindrical first element part (250). The second element (300) is slidably and rotatably arranged in the body (100), and a central axis (314) of the first connection (310), of the second element (300), is eccentric to a central axis (312) of the cylindrical second element part (350).

As another example, some embodiments include a method for connecting a pump (400) to a machine (500) using an adapter incorporating teachings of the present disclosure. The pump (400) has two connectors, and the two connectors of the pump are any two of a separate coupling and a separate nipple. The method comprises sliding and rotating (610) one or both of the first element (200) and the second element (300) to adjust the distance between, on one hand, the first connection (210), of the first element (200), for one of the two connectors, and, on the other hand, the first connection (310), of the second element (300), for the other of the two connectors; connecting (620) the adapter to the two connectors (410, 420) of the pump (400); and connecting (630) a hose (450) with a coaxial coupling and nipple between the adapter and the machine (500).

In some embodiments, when any one or any two or all three of the body (100), the first element (200), and the second element (300) comprises a safety valve (360) configured to open at a pre-set pressure, the method further comprises: if the safety valve (360) lets out fluid, then change (640) the connection to one of the two connectors of the pump (400) with the connection to the other of the two connectors of the pump (400).

In some embodiments, a coaxial fluid hose can be used and can be connected to a pump even when the positions of the nipple and coupling on the pump differ. Different pumps can be used for the same coaxial fluid hose and hydraulic tool. Embodiments of the adapter and method work together with already existing pumps, hydraulic tools, couplings, and hose kits. The adapter is not expensive to produce. At least one embodiment avoids cumbersome arrangements that are expensive to manufacture. In some embodiments, a user may make an ad hoc filed adaptation to use coaxial fluid hose equipment. This saves reconstruction time and lead-time. The adapter reduces storage space and handling since only one adaptor is necessary.

Figure 2:
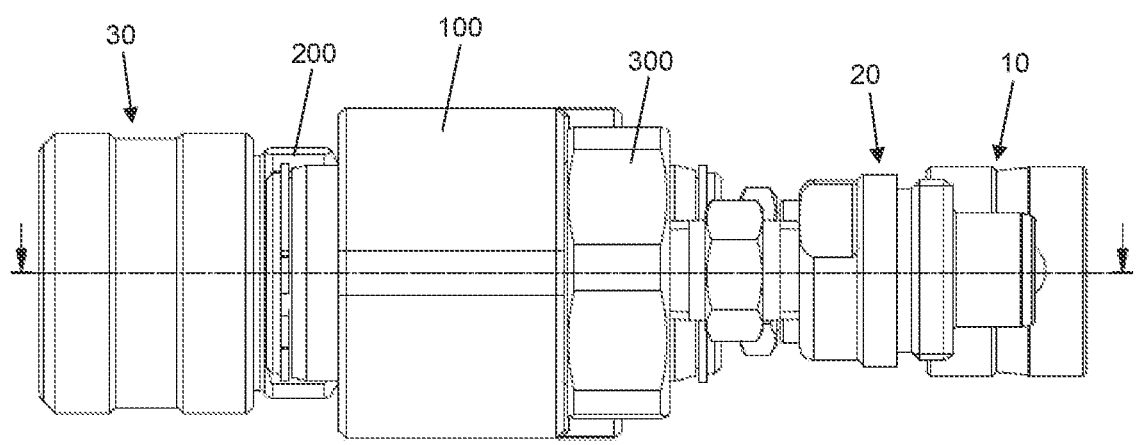
FIG. 2 is a diagrammatic illustration of an adapter incorporating teachings of the disclosure.
Figure 3:
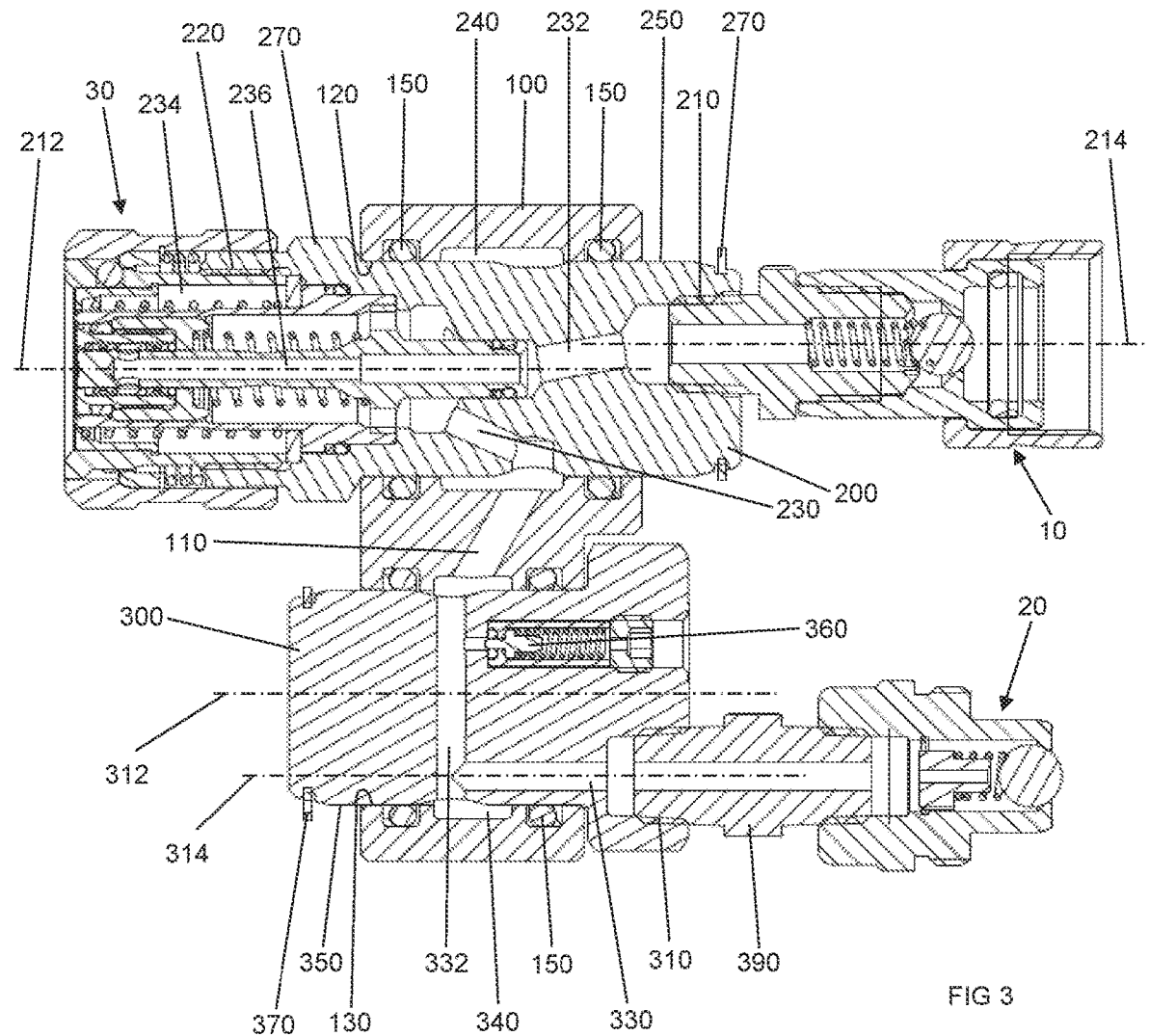
FIG. 3 is a diagrammatic illustration of the adapter, along a cut indicated in FIG. 2.
Figure 4:
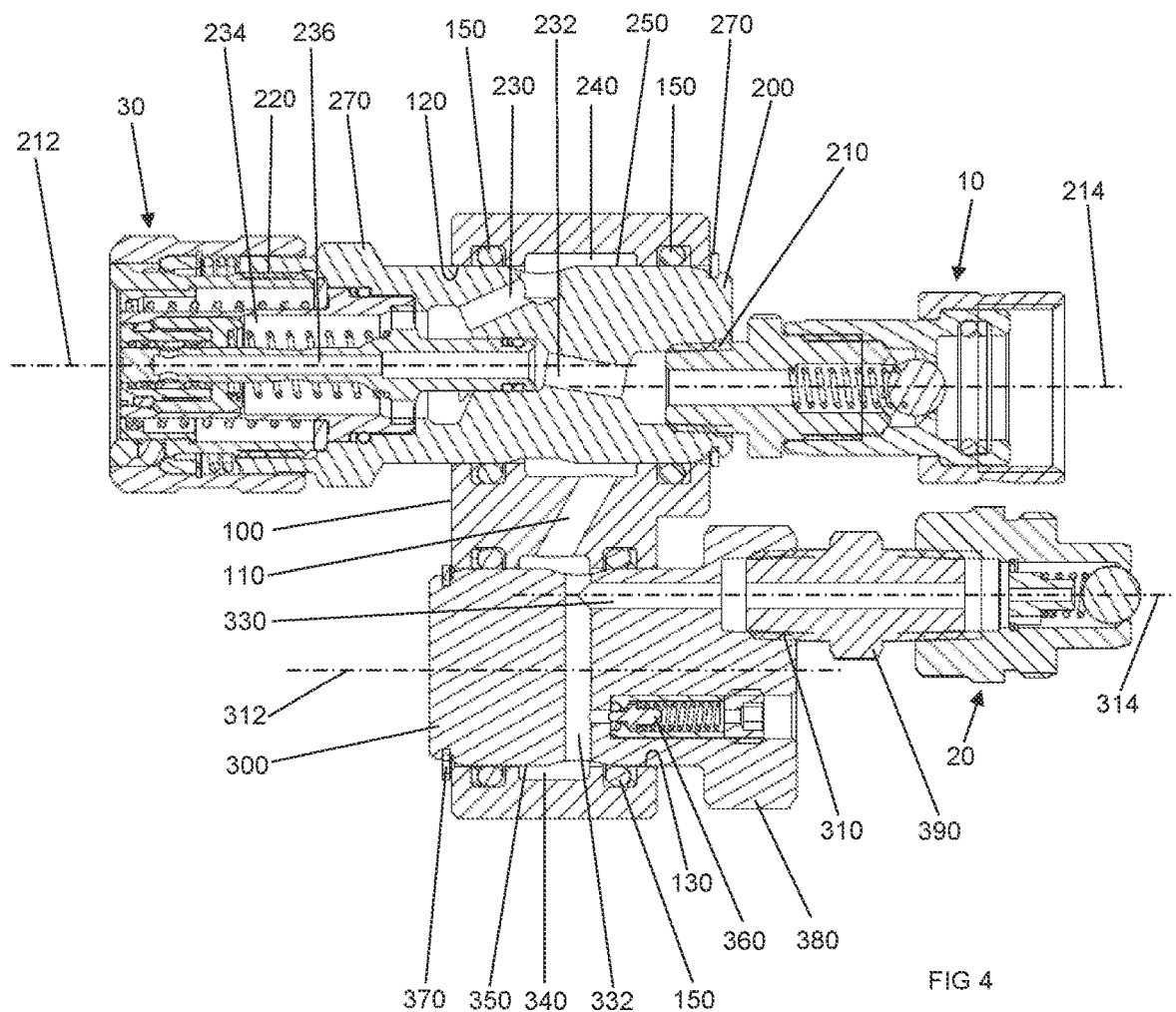
FIG. 4 is a diagrammatic illustration of the adapter, along a cut indicated in FIG. 2.
Figure 5:
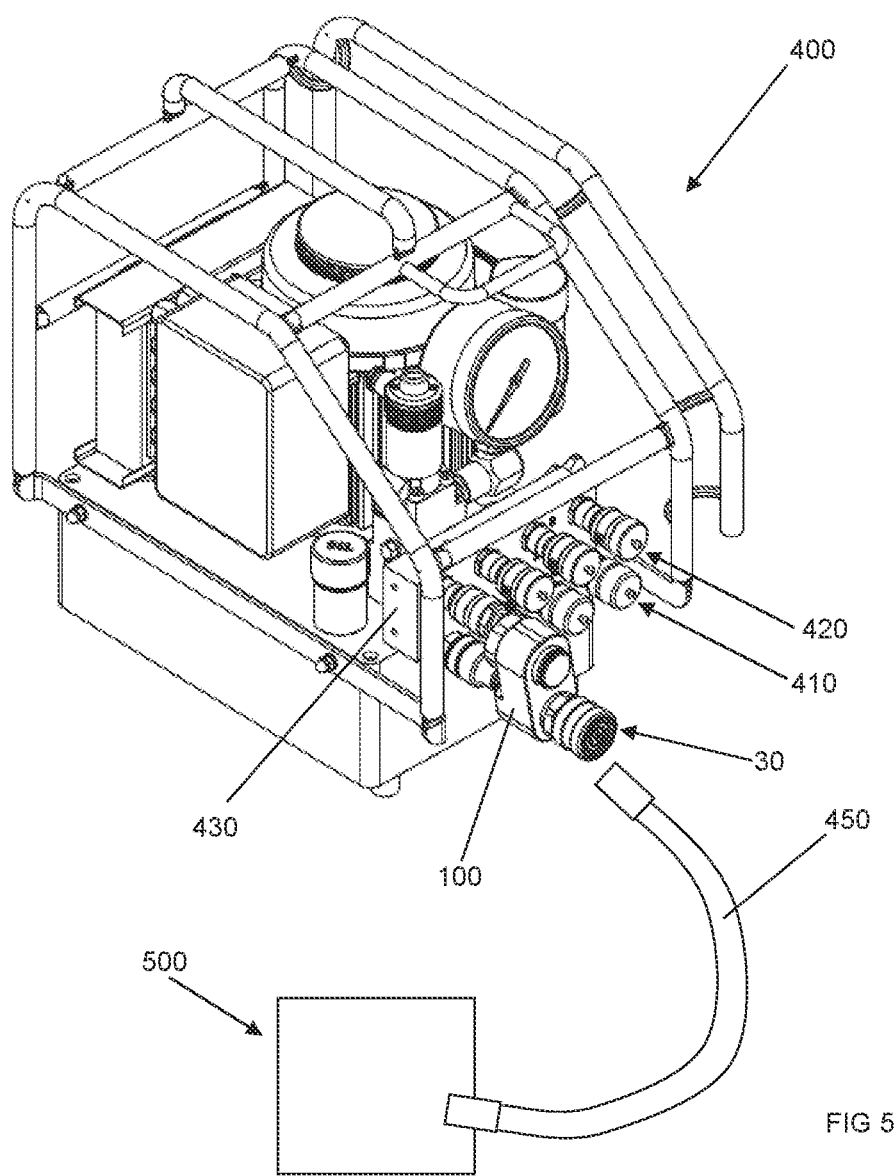
FIG. 5 is a diagrammatic illustration of a pump, a hose, a tool, and the adapter incorporating teachings of the disclosure.
Figure 6:
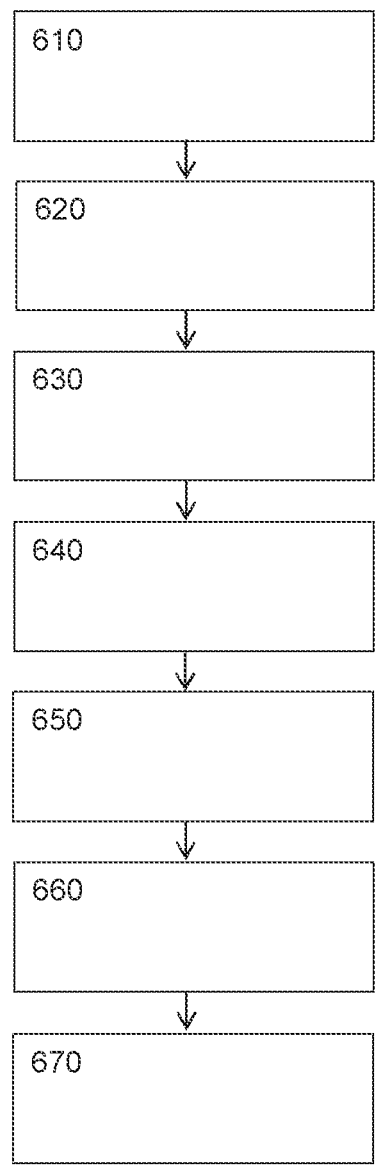
FIG. 6 is a diagrammatic illustration of an example method according incorporating teachings of the disclosure.

FIG. 1 shows an example embodiment of an adapter incorporating teachings of the present disclosure, FIG. 2 shows the example embodiment of the adapter from the side, and FIGS. 3 and 4 show the example embodiment of the adapter along the cut indicated in FIG. 2. FIG. 5 shows the adapter connected to a nipple and a coupling (420, 410) of a pump (400), with a coaxial hose for fluid (450), or a twin hose (450), between the adapter and a tool (500). FIG. 6 is a flow diagram of the method. The nipple is the male part and the coupling is the female part. In some embodiments, the nipples and the couplings described herein are quick connect nipples and quick connect couplings, or screw to connect nipples and couplings.

Turning first briefly to FIG. 5, the pump (400) may have an array of couplings and nipples (410, 420) to which a hydraulic tool (500) may be connected. The hydraulic tool (500) may, for example, be a torque wrench tool. In relation to the problems described above, the problem that two hoses, or more hoses, easily get tangled and twisted is directly evident from FIG. 5. The further problems of the nipple and the coupling of the pump being in fixed positions, being different at different pumps, and different relative positions between the nipple and the coupling, is also directly evident from FIG. 5. The solution to at least some of the problems mentioned herein is to use an adapter that can accommodate for different couplings and nipples, and their different positions, and to allow use of a coaxial fluid hose between the pump (400) and the tool (500).

Turning to FIGS. 1 to 4, the adapter is between, on one hand, two connectors (10, 20), and on the other hand, a coaxial coupling or a coaxial nipple (30). The two connectors are any combination of a separate coupling (10) and a separate nipple (20). The two connectors (10, 20) may be a first connector (10) and a second connector (20). The separate coupling (10) may be a screw to connect coupling (10), and the separate nipple (20) may be a screw to connect nipple (20). The separate coupling (10) may be a quick connect coupling (10), and the separate nipple (20) may be a quick connect nipple (20). The separate coupling and nipple (10, 20) are not lloaxiall couplings or nipples.

The separate coupling and nipple (10, 20) are to be connected to, for example, to any combination of a nipple and a coupling (420, 410) of a pump (400). The separate coupling (10) and the separate nipple (20) are separate because they are separate parts from the adapter, i.e. they can be interchanged so that the adapter can have the right separate coupling and nipple (10, 20) for any kind of pump (400). The coaxial coupling (30) may be a coaxial quick connect coupling (30) or a coaxial quick connect nipple (30). By allowing the separate coupling (10) and the separate nipple (20) and the coaxial coupling or a coaxial nipple (30) to be freely changed on the adapter, the adapter can connect and provide hydraulic fluid connection between any pump (400) and any tool (500), using a coaxial hydraulic fluid hose (450), or a twin fluid hose, to overcome at least some of the problems mentioned above.

The adapter comprises a body (100) comprising a first cylindrical opening (120) for a first element (200) and a second cylindrical opening (130) for a second element (300). The body (100), the first element (200), and the second element (300) may be each separate parts. The two connectors, such as for example the separate coupling (10), and the separate nipple (20) may be connected, for example by a screw connection, to the first element (200) and the second element (300), respectively.

The first element (200) comprises a first element part (250) being cylindrical to fit in the first cylindrical opening (120). The first element (200) also comprises a first connection (210), of the first element (200), for one of the two connectors (10), for example the separate coupling (10) or the separate nipple (20), the first connector (10). The first element (200) also comprises, and a second connection (220), of the first element (200), for the coaxial coupling or nipple (30). The first connection (210) and the second connection (220), of the first element (200), may be on opposite ends of the first element (200) with the first element part (250) between the two connections, with the first element part (250) inside the first cylindrical opening (120) of the body (100). The first element part (250) may be an integral part of the first element and may also be arranged in the first cylindrical opening (120) of the body (100). The two connectors, for example the separate coupling (10) or the separate nipple (20), may be connected, for example by a screw connection, to the first connection (210), of the first element (200). The coaxial coupling or a coaxial nipple (30) may be connected, for example by a screw connection, to the second connection (220), of the first element (200). The first connection (210) and the second connection (220) may be threaded screw connections.

The second element (300) comprises a second element part (350) being cylindrical to fit in the second cylindrical opening (130). The second element (300) also comprises a first connection (310), of the second element (300), for the other of the two connectors (20), for example the separate coupling (10) or the separate nipple (20), the second connector (20). The other one of the two connectors, for example the separate coupling (10), or the separate nipple (20), may be connected, for example by a screw connection, to the first connection (310), of the second element (300). The second element part (350) may be an integral part of the second element (300) and may also be arranged in the second cylindrical opening (130) of the body (100). The first connection (310) may be on one end of the second element (300) with the second element part (350) inside the second cylindrical opening (130) of the body (100). The first connection (310) may be a threaded screw connection.

The first element (200) is slidably and rotatably arranged in the body (100). The first element part (250) may slide, move, axially and rotate in the first cylindrical opening (120). A central axis (214) of the first connection (210), of the first element (200), is eccentric to a central axis (212) of the cylindrical first element part (250). The first element part (250) may be held, positioned, within the body (100) and rotated around, and slid along, its own axis so as to adjust the position of the connection (210), of the first element (200), connecting one of the two connectors, for example, the separate coupling (10) or the separate nipple (20). Only the first element part (250), thus not the second element (300), may be fitted and arranged slidably and rotatably in the first cylindrical opening (120) so that the first element (200) is slidably and rotatably arranged in the body (100).

The second element (300) is slidably and rotatably arranged in the body (100). The second element part (350)

may slide, move, axially and rotate in the second cylindrical opening (130). A central axis (314) of the first connection (310), of the second element (300), is eccentric to a central axis (312) of the cylindrical second element part (350). The second element part (350) may be held, positioned, within the body (100) and rotated around, and slid along, its own axis so as to adjust the position of the connection (310), of the second element (300), connecting the other one of the two connectors, for example the separate coupling (10) or the separate nipple (20). Only the second element part (350), thus not the first element part (250), may be fitted and arranged slidably and rotatably in the second cylindrical opening (130) so that the second element (300) is slidably and rotatably arranged in the body (100).

The adapter, with the slidably and rotatably arranged first element (200) and second element (300), allows the distance between the two connectors (10, 20), for example the separate coupling (10) and the separate nipple (20), to be adjusted, as well as their axial position relative to the body (100) of the adapter. In this way the adapter can position the two connectors (10, 20) of the adapter in the right positions where the a nipple and a coupling (420, 410) of a pump (400) are. Due to the central axis (214) of the first connection (210), of the first element (200), and the central axis (314) of the first connection (310), of the second element (300), being eccentric, not being concentric with the first and second cylindrical openings (120, 130), respectively, their relative distance may be adjusted to fit to an array of couplings and nipples (410, 420) of a pump (400).

In some embodiments, the central axis (214) of the first connection (210), the central axis (212) of the cylindrical first element part (250), the central axis (314) of the first connection (310), and the central axis (312) of the cylindrical second element part (350) may all be arranged parallel to each other. The first element (200) and the second element (300) may be parallel to each other, and may also be parallel to these four axes. The adapter body (100) may lay in one plane and the first element (200) and the second element (300) may be arranged perpendicular to, and going through, that plane.

In some embodiments, the first connection (210), of the first element (200), and the first connection (310), of the second element (300), may face in one direction, and the second connection (220), of the first element (200), may face in the opposite direction. The two connectors (10, 20), any combination of the separate coupling (10) and the separate nipple (20), may thus face in one and the same direction, and the coaxial nipple or coupling may face in the opposite direction.

In some embodiments, the adapter may comprise a safety valve (360). Each or any two or all three of the body (100), the first element (200), and the second element (300) may comprise the safety valve (360). The safety valve (360) may be configured to open at a pre-set pressure, for example 20 MPa (200 bar). This allows a detection if the adapter is connected incorrectly and a pressure builds up inside the adapter. If the pressure becomes so large that the safety valve (360) opens, then a user can detect fluid escaping through the safety valve and then take appropriate action, for example connecting the adapter, pump and tool correctly.

In some embodiments, the first cylindrical opening (120), for the first element (200), may comprise a first circumferential fluid groove (240); the second cylindrical opening (130), for the second element (300) may comprise a second circumferential fluid groove (340); and the first circumferential fluid groove (240) and the second circumferential fluid groove (340) may be connected with a fluid connection passage (110). The first circumferential fluid groove (240), the second circumferential fluid groove (340), and the fluid connection passage (110) may all three be within the body (100) of the adapter. The first circumferential fluid groove (240) and the second circumferential fluid groove (340) may In some embodiments, the first element (200) may comprise a first fluid passage (230) connecting the first circumferential groove (240) with an outer passage (234) of the second connection (220), of the first element (200), for the coaxial coupling or nipple (30). According to one embodiment, the first element (200) may comprise a second fluid passage (232) connecting the first connection (210), of the first element (200), for one of the two connectors, for example the separate coupling (10) or the separate nipple (20), with an inner passage (236) of the second connection (220), of the first element (200), for the coaxial coupling or nipple (30). The first connection (210), of the first element (200), may be an opening with threads on the inside to which one of the two connectors, for example the separate coupling (10) or the separate nipple (20), can be connected.

In some embodiments, the second element (300) may comprise a third fluid passage (330) connecting the first connection (310), of the second element (300), for the other one of the two connectors, for example the separate coupling (10) or the separate nipple (20), with a fourth fluid passage (332). According to one embodiment, the fourth fluid passage (332) may be traversing along the diagonal of the second element (300) connecting to the second circumferential fluid groove (340). The fourth fluid passage (332) may open on both sides of the second element (300). By the fourth fluid passage (332) having two openings into the second circumferential fluid groove (340), a more even and more efficient fluid flow through the adapter is achieved.

In some embodiments, the first circumferential fluid groove (240) and the second circumferential fluid groove (340) may extend in the axial direction of the first cylindrical opening (120) and the second cylindrical opening (130), so as to allow a fluid flow when the first element (200) and the second element (300) are moved in the axial direction. The extent in the axial direction may be equal to the extent that the first element (200) and the second element (300) can be moved in the axial direction. That is, the width of the first circumferential fluid groove (240) and the second circumferential fluid groove (340) be equal to the extent that the first element (200) and the second element (300) can be moved in the axial direction.

In some embodiments, and as shown in FIGS. 3 and 4, a flow of fluid from one of the connectors (10), for example the first connector (10), the separate coupling (10), to the inner fluid passage of the coaxial coupling (30) may be realised, as well as a flow of fluid from the other one of the two connectors (20), for example the second connector (20), the separate nipple (20), to the outer fluid passage of the coaxial coupling (30), while at the same time allow the first element (200) and the second element (300) to be moved in the axial direction and to be rotated around their axes, respectively.

In some embodiments, the first element (200) and the second element (300) may each comprise axial stops (270, 370) limiting their slidable movement within the body (100). The stops (270, 370) limit the movement in the axial direction of the first element (200) and the second element (300). Each element may have one or more stops. For example, the stop may be a ring (270) with a cut, so that the ring can be expanded and clamped in a groove around the first element (200) or the second element (300). The stops (270, 370), the axial stops, may be integral with the first element (200) or the second element (300), e.g. by shape. For example, as illustrated in FIGS. 3 and 4, the second element (300) may be T-shaped, where the roof of the T prevents axial movement. There may be a further technical advantage with the T-shape, as follows.

In some embodiments, the first element (200) or the second element (300) may have a flange (280, 380) extending perpendicular to the axis of the first element (200) or the second element (300), respectively, to allow larger eccentricity. For example, the first element (200) may have a flange (270) that prevents movement in the axial direction, but also allows a larger coaxial coupling (30) to be connected to the first element (200) of the adapter. For example, the second element (300) may have a flange (380) by, for example, being T-shaped, as also described above. The T-shape functions then also as a stop for axial movement of the second element (300), but also allows the first connection (310), of the second element (300), to be more eccentric to the central axis (312) of the cylindrical second element part (350). This allows for the separate coupling (10) and the separate nipple (20) to be positioned further apart on the adapter.

In some embodiments, the adapter may comprise the coaxial nipple (30) or the coaxial coupling (30). The coaxial nipple or coupling (30) may be a rotatable coaxial nipple or coupling (30), allowing the coaxial nipple or coupling to rotate relative to the adapter. The rotation may be around the axis of the coaxial nipple or coupling (30). In some embodiments, the first element (200) may comprise one of the two connectors (10), for example the first connector (10), for example the separate coupling (10) or the separate nipple (20), and the coaxial coupling or a coaxial nipple (30), and the second element (300) may comprise the other one of two connectors (20), for example the second connector (20), for example the separate nipple (20) or the separate coupling (10). The adapter may comprise a coaxial quick connect coupling or a coaxial quick connect nipple (30). The adapter may comprise the separate coupling (10) and the separate nipple (20) arranged in the first connection (210), of the first element (200), and the first connection (310), of the second element (300), respectively.

In some embodiments, the adapter may further comprise sealing means (150), for example o-rings, between the first cylindrical opening (120) and the first element (200), and between the second cylindrical opening (130) and the second element (300). The sealing means (150) may be between the first cylindrical opening (120) and the first element part (250), and between the second cylindrical opening (130) and the second element part (350).

As another example, some embodiments include a method for connecting a pump (400), having two connectors (410, 420), to a machine (500). The two connectors of the pump may be any combination of a separate coupling and/or a separate nipple. The method for connecting the pump (400) to a machine (500) uses an adapter as described herein. The method steps (610 to 670) can be taken in any order, as long as it makes technical sense.

The method is for connecting a pump (400) having two connectors (410, 420) to a machine (500), such as for example a hydraulic tool. The two connectors may be at least two connectors, and any combination of a coupling and a nipple. The connectors (410, 420) may be in a block (430) on a pump (400). The method of connecting uses the adapter according to any one of the preceding embodiment. The method comprises the following.

Sliding and rotating (610) one or both of the first element (200) and the second element (300) to adjust the distance between, on one hand, the first connection (210), of the first element (200), for one of the two connectors (10), and, on the other hand, the first connection (310), of the second element (300), for the other of the two connectors (20). In this way the positions between the two connectors (10, 20) of the adapter are adjusted so that they correspond to the positions of the two connectors (410, 420) of the pump (400). This allows for a correct connection to be made between the two pairs of connectors, for example two pairs of nipples and couplings.

Connecting (620) the adapter to two connectors (410, 420) of the pump (400). The coupling (10) and the nipple (20) of the adapter are connected to the nipple (420) and the coupling (410), respectively, of the pump (400). Hereby the adapter is connected to the pump (400).

Connecting (630) a hose (450) with a coaxial coupling and nipple between the adapter and the machine (500). The hose (450) may for example be a twin fluid hose. The hose (450), preferably a coaxial hose, is connected to the coaxial coupling or the coaxial nipple (30) of the adapter, and to a coaxial coupling or a coaxial nipple of the machine (500). The machine (500) may be a hydraulic tool, for example a hydraulic torque wrench.

In some embodiments, a step that may be taken before all steps, or at least before the connection step (620), may be to select and attach a set of two connectors (10, 20), as mentioned above, to the adapter. The selection is made dependent on what types of connectors the pump (400) uses. For example, a separate coupling (10) and a separate nipple (20) may be selected to the adapter that can be connected to a nipple (420) and a coupling (410) of the pump (400).

In some embodiments, and when any one or any two or all three of the body (100), the first element (200), and the second element (300) comprises a safety valve (360) configured to open at a pre-set pressure, the method may further comprise the following.

If the safety valve (360) lets out fluid, then change (640) the connection to one of the two connectors of the pump (400) with the connection to the other of the two connectors of the pump (400), thus changing place of the two connectors (10, 20) on the adapter. The safety valve (360) allows fluid to escape through the safety valve (360) when the pressure within the adapter is over a pre-set amount of pressure, for example 20 MPa (200 bar). This allows for a detection if the adapter is connected incorrectly and a pressure builds up inside the adapter. If the pressure becomes so large that the safety valve (360) opens, then a user can detect fluid escaping through the safety valve and then take appropriate action, for example connecting the adapter, pump and tool correctly. For example, a leak may indicate that the supply and return, the forward and backward, fluid supply, may have been mixed up and has to be interchanged. This may be done by, for example, interchanging the separate coupling (10) and the separate nipple (20) on the adapter. Thus, if the safety valve (360) lets out fluid, then a user may change (640) place of the two connectors (10, 20) on the adapter.

In some embodiments, the method may further comprise changing (650) one or more of the two connectors (10, 20), and the coaxial coupling (30) or coaxial nipple of the adapter. In some embodiments, the method may further comprise using (660) an extension (390) between, on one hand, the first connection (210), of the first element (200), for one of the two connectors (10), or the first connection (310), of the second element (300), for the other one of the two connectors (20), and on the other hand any one of the two connectors (10, 20). This allows the right sets of coupling (10) and nipple (20) to be connected to the pump (400), and the right coaxial coupling (30) or nipple to be connected to the tool (500). This also allows to extend the distance between the adapter and any one of the two connectors (10, 20), for example the separate coupling (10) or the separate nipple (20).

In some embodiments, the method may further comprise connecting (670) a rotatable coaxial coupling (30) or nipple to the adapter. The coaxial coupling (30) or the coaxial nipple (30) may be rotatable around its own axis, so that it can rotate relative to the adapter. This prevents tangling and twisting of the coaxial hose between the pump (400) and tool (500).

In some embodiments, the adapter is configured for a high pressure hydraulic fluid. The high pressure hydraulic fluid may have a pressure of 70 bar (7 MPa) or more, or 100 bar (10 MPa) or more, or up to 200 bar (20 MPa).

This written description uses examples to illuminate the teachings herein and also to enable any person skilled in the art to practice the teachings, including making and using the adapters and performing the methods.

LIST OF ELEMENTS 10 first of two connectors, for example a separate coupling
20 second of two connectors, for example separate nipple
30 coaxial coupling or coaxial nipple
100 body
110 fluid connection passage
120 first cylindrical opening
130 second cylindrical opening
150 o-ring
200 first element
210 first connection of the first element
212 central axis of the first element part
214 central axis of the first connection of the first element
220 second connection of the first element
230 first fluid passage
232 second fluid passage
234 outer passage
236 inner passage
240 first circumferential fluid groove
250 first element part
270 axial stop
280 flange
300 second element
310 first connection of the second element
312 central axis of the second element part
314 central axis of the first connection of the second element
340 second circumferential fluid groove
330 third fluid passage
332 fourth fluid passage
350 second element part
360 safety valve
370 axial stop
380 flange
400 pump
410 connector, for example coupling of pump
420 connector, for example nipple of pump
430 block
450 hose
500 machine
610 to 670 method steps

The invention claimed is:

1. An adapter between two connectors and a coaxial coupling or a coaxial nipple, wherein the two connectors are any combination of a separate coupling and a separate nipple, the adapter comprising:
   a body defining a first cylindrical opening for a first element and a second cylindrical opening for a second element;
   the first element including a first cylindrical element part to fit in the first cylindrical opening, a first connection for a first of the two connectors, and a second connection for the coaxial coupling or nipple; and
   the second element including a second cylindrical element part to fit in the second cylindrical opening, and a third connection for a second of the two connectors;
   wherein the first element is slidably and rotatably arranged in the body, and a central axis of the first connection is eccentric to a central axis of the cylindrical first element part; and
   wherein the second element is slidably and rotatably arranged in the body, and a central axis of the third connection is eccentric to a central axis of the cylindrical second element part.

2. The adapter according to claim 1, wherein the central axis of the first connection, the central axis of the cylindrical first element part, the central axis of the first connection, and the central axis of the cylindrical second element part are all arranged parallel to each other.

3. The adapter according to claim 1, wherein the first connection and the third connection face in one direction, and the second connection faces in an opposite direction.

4. The adapter according to claim 1, wherein each or any two or all three of the body, the first element, and the second element comprise a safety valve configured to open at a pre-set pressure.

5. The adapter according to claim 1, wherein:
   the first cylindrical opening comprises a first circumferential fluid groove;
   the second cylindrical opening comprises a second circumferential fluid groove; and
   the first circumferential fluid groove and the second circumferential fluid groove are connected by a fluid connection passage.

6. The adapter according to claim 5, wherein:
   the first element comprises a first fluid passage connecting the first circumferential groove with an outer passage of the second connection for the coaxial coupling or nipple; and
   the first element comprises a second fluid passage connecting the first connection with an inner passage of the second connection for the coaxial coupling or nipple.

7. The adapter according to claim 5, wherein:
   the second element comprises a third fluid passage connecting the third connection with a fourth fluid passage; and
   the fourth fluid passage traverses along the diagonal of the second element connecting to the second circumferential fluid groove.

8. The adapter according to claim 1, wherein the first element and the second element each comprise axial stops limiting slidable movement within the body.

9. The adapter according to claim 1, wherein at least one of the first element or the second element has a flange extending perpendicular to the central axis of the respective element.

10. The adapter according to claim 1, further comprising the coaxial nipple or the coaxial coupling comprising a rotatable coaxial nipple or coupling, allowing the coaxial nipple or coupling to rotate relative to the adapter; and/or wherein the first element comprises one of the two connectors, and the coaxial coupling or a coaxial nipple, and the second element comprises the other of the two connectors.

11. The adapter according to claim 1, further comprising:
a first seal between the first cylindrical opening and the first element;
a second seal between the second cylindrical opening and the second element; or
wherein only the central axis of the first connection is eccentric to the central axis of the cylindrical first element part, or only the central axis of the third connection is eccentric to a central axis of the cylindrical second element part.

12. A method for connecting a pump having two connectors to a machine using an adapter, wherein the two connectors of the pump are any two of a separate coupling and a separate nipple, the method comprising:
sliding and rotating one or both of a first element and a second element to adjust the distance between a first connection of the first element for one of the two connectors, and a third connection of the second element, for the other of the two connectors;
connecting the adapter to the two connectors of the pump; and
connecting a hose with a coaxial coupling and nipple between the adapter and the machine.

13. The method according to claim 12, wherein:
any one or any two or all three of the body, the first element, and the second element comprise a safety valve configured to open at a pre-set pressure; and
the method further comprises, if the safety valve lets out fluid, changing the connection to one of the two connectors of the pump with the connection to the other of the two connectors of the pump.

14. The method according to claim 12, the method further comprising:
changing one or more of the two connectors, and the coaxial coupling or coaxial nipple of the adapter; and/or
using an extension between the first connection of the first element or the third connection of the second element and on the other hand any one of the two connectors.

15. The method according to claim 12, further comprising connecting a rotatable coaxial coupling or nipple to the adapter.

* * * * *